United States Patent [19]

Hendrickson

[11] Patent Number: 4,867,482

[45] Date of Patent: Sep. 19, 1989

[54] LUGLESS PIPE COUPLINGS

[75] Inventor: Thomas R. Hendrickson, Pontiac, Mich.

[73] Assignee: Urdan Industries (USA) Inc., Southfield, Mich.

[21] Appl. No.: 248,647

[22] Filed: Sep. 26, 1988

[51] Int. Cl.$^4$ ............................................. F16L 21/06
[52] U.S. Cl. ..................................... 285/12; 285/112; 285/373
[58] Field of Search .............. 285/112, 419, 373, 253, 285/12

[56] References Cited

U.S. PATENT DOCUMENTS

| | | | |
|---|---|---|---|
| 926,532 | 6/1909 | Wilson | 285/419 X |
| 1,278,598 | 9/1918 | Cooper | 285/253 X |
| 1,976,797 | 10/1934 | Naylor | 285/373 |
| 2,759,744 | 8/1956 | Risley | 285/112 |
| 3,239,254 | 3/1966 | Campbell | 285/419 X |
| 3,315,991 | 4/1967 | Davis | 285/373 |
| 3,355,193 | 11/1967 | Craig et al. | 285/373 X |

FOREIGN PATENT DOCUMENTS

| | | | |
|---|---|---|---|
| 1051585 | 2/1959 | Fed. Rep. of Germany | 285/367 |
| 2157192 | 7/1972 | Fed. Rep. of Germany | 285/373 |

*Primary Examiner*—Thomas F. Callaghan
*Attorney, Agent, or Firm*—Harness, Dickey & Pierce

[57] ABSTRACT

A pipe coupling is formed of a pair of similar semicircular segments of a preselected diameter which are fastened together by separate, standard-size, length-adjustable fasteners to form a predetermined diameter circular casing for surrounding and connecting adjacent, axially aligned pipe ends. Each segment has radially arranged, opposite end faces which abut the corresponding end faces of the other segment to form a pair of diametrically aligned junctures. Depressed sockets are formed in the exterior, peripheral surface of each segment near the junctures. Each fastener is formed of an internally threaded tube having an end portion telescopically fitted within a tubular barrel, with a screw having a head engaged against the free end of the barrel and a shank extending through the barrel and threadedly engaged within the tube. The laterally extending teeth which are formed on the tube and barrel fit into the sockets on opposite sides of each juncture. Tightening the screw moves the barrel axially relative to the tube for moving the barrel teeth and tube teeth towards each other and, consequently, compressing adjacent segment faces towards each other. A large number of different diameter pairs of segments can be interchangeably used with a single, standard length fastener.

10 Claims, 1 Drawing Sheet

U.S. Patent Sep. 19, 1989 4,867,482
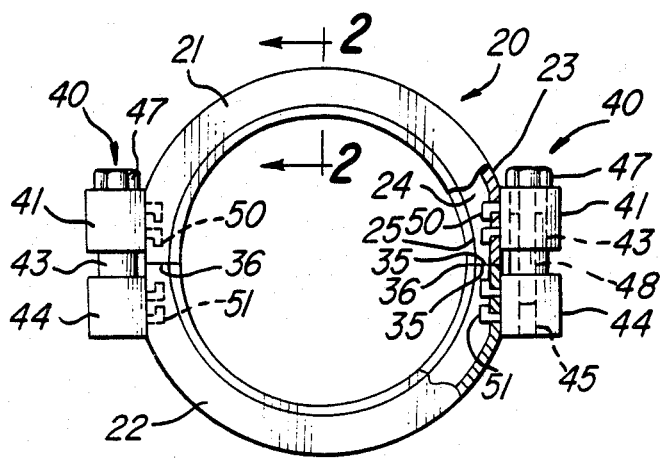
Fig-1
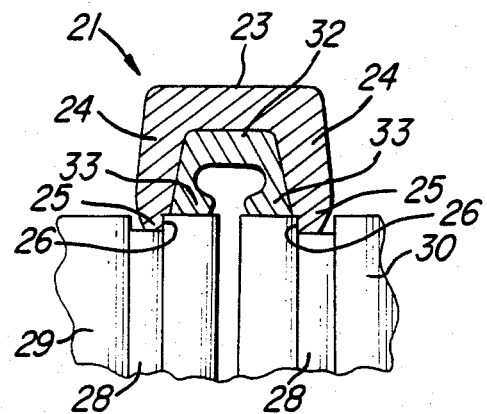
Fig-2
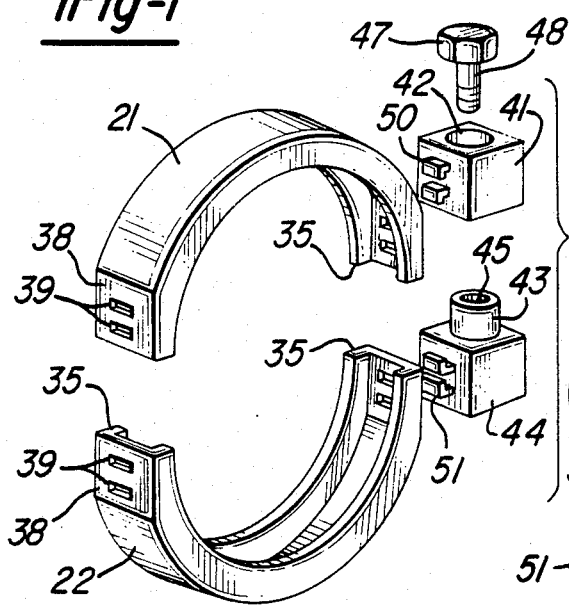
Fig-3
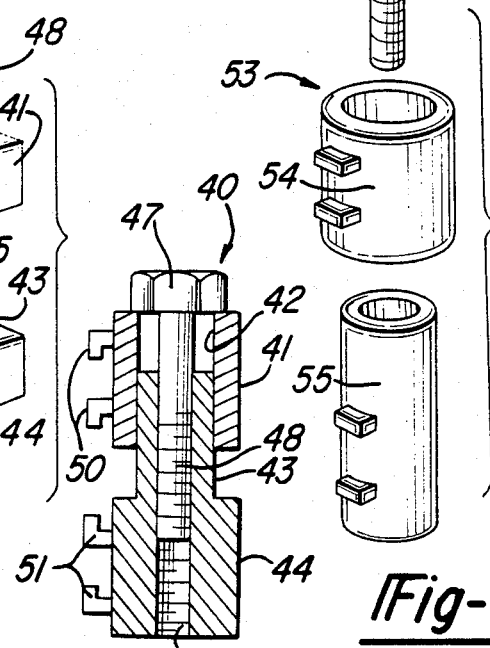
Fig-4
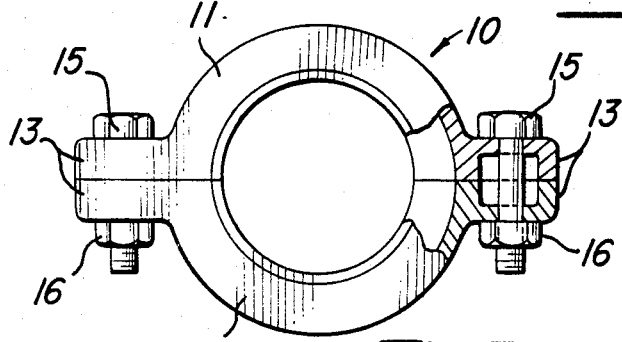
Fig-5
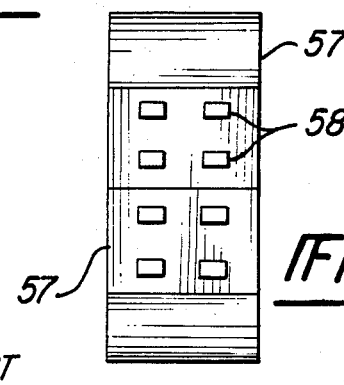
Fig-7 PRIOR ART
Fig-6

LUGLESS PIPE COUPLINGS

BACKGROUND OF INVENTION

This invention relates to pipe couplings of the type formed of a pair of semicircular segments which are bolted together to form a circular casing that extends around and couples together adjacent pipe ends. An example of that type of coupling is illustrated in U.S. Pat. No. 3,054,629 issued Sept. 18, 1962 to Piatek.

Prior couplings of the type formed of a pair of semicircular segments are usually made of metal castings. Each of the segments is formed with exterior, diametrically extending lugs. When the segments are arranged together, the lugs overlap. Bolts are extended through the lugs for fastening the segments together and producing the circular shape of the casing.

In the past, the casings have been formed either U-shaped in cross-section or in solid cross-sections. Where they have been U-shaped in cross-section, their legs were designed for fitting into grooves formed on the exterior surfaces of the adjacent pipes so that the pipes are interlocked together with the casing. In the instances where the couplings have been more solid in cross-sectional shape, they have been fastened to the pipes by other means. However, in either event, the casing segments have included lugs which are arranged to overlap and to be bolted together.

Because couplings of the type described above are intended for use in coupling together a wide variety of different diameter pipes, it has been necessary to stock a large number of different size segments. Since it is common to form the segments of castings, it has been necessary to form expensive patterns and, in many cases, expensive molds for use, when necessary, to produce new segments. These molds and patterns have been relatively expensive to manufacture and to inventory until needed.

In addition, the casting of the lugs requires additional care and results in additional imperfections in the castings from time to time which increases the amount of scrap in the production of these kinds of couplings.

Further, where the coupling segments are formed with lugs, their sizes and weights are materially increased so that transporting them, stocking them in inventory, and carrying them to plumbing sites where they are to be used is relatively awkward and costly.

Hence, this invention relates to an improved coupling in which the conventional lugs are eliminated and, instead, a small number of "standard" fasteners, which are separate from the coupling castings, may be used for fastening together a large number of different size segments. Thus, the segments are smaller, less costly to manufacture and to transport, and are simpler to stock and handle since a wide assortment of sizes of semicircular segments may be used with a considerably smaller number of sizes of fasteners.

SUMMARY OF INVENTION

The invention herein contemplates forming circular coupling casings out of two separate, semicircular segments, which may be made of metal castings, and providing each of the segments with sockets. Separate, standard size fasteners are provided for releasably engaging with the adjacent segments and for tightening them together when they are to be used for coupling pipe ends. Hence, one size fastener may be used to couple together a large assortment of sizes of segments to provide the circular coupling therefrom.

The invention contemplates forming the coupling casing segments as cast metal semicircles having radially extending end faces for engagement with similar faces on their opposite segment. Each of the segments are provided with depressed openings or sockets near the juncture with the opposite segment. A length-adjustable fastener, having laterally extending teeth engaged within the respective sockets, is applied to the assembled segments and manually tightened in place to clamp the segments together for connecting the pipe ends. Thus, single size fasteners may be stocked and carried along with a collection of multiple size couplings which couplings are smaller, lighter weight, less susceptible to damage and easier to handle on a plumbing job.

As can be seen, one of the objects of this invention is to provide a less expensive, smaller, lighter weight and easier to manufacture coupling segment which can be formed in multiple sizes and used with a single size fastener.

Another object of this invention is to provide a simply constructed, inexpensive, easily appliable fastener which is adapted to fasten together different size coupling segments and, particularly, can be easily applied by a plumber in tight or close spaces utilizing one hand.

These and other objects and advantages of this invention will become apparent upon reading the following description, of which the attached drawings form a part.

DESCRIPTION OF DRAWINGS

FIG. 1 illustrates, partially in cross-section, a coupling formed of two casing segments which are fastened together by separate removable fasteners.

FIG. 2 is a cross-sectional, enlarged, fragmentary view taken in the direction of arrows 2—2 of FIG. 1 illustrating the connection of two adjacent pipe ends.

FIG. 3 is a perspective, diassembled view, showing the lugless coupling segments and one fastener.

FIG. 4 is a cross-sectional, enlarged view of one of the fasteners.

FIG. 5 shows a modified form of fastener.

FIG. 6 is an elevational side view of a coupling showing the use of pairs of aligned sockets in each of the segments.

FIG. 7 is a view, to a smaller scale, partially in cross-section, of a prior art coupling utilizing lugs and bolts for fastening the coupling casing segments together.

DETAILED DESCRIPTION

FIG. 7 illustrates a prior art type of coupling 10. This coupling is formed of two substantially identical segments 11 and 12 which are U-shaped in cross-section. Hollow lugs 13 are integrally formed on each of the opposite ends of each of the segments. These lugs have holes formed in them to receive bolts 15. The bolts extend through the aligned pairs of lugs and are fastened in place by suitable nuts 16.

The coupling shown in FIG. 7 is designed for coupling together pipes which have grooves formed on their ends either by roll-forming or cutting. However, FIG. 7 is illustrative of prior art couplings which utilize lugs and, therefore, also represents coupling segments which are of substantially solid, rectangular cross-section.

Turning to FIGS. 1 and 2, the improved coupling 20 of this invention is formed of a pair of lugless segments 21 and 22. These segments are formed of metal castings, as in the case of the prior art coupling segments. Each of the segments, if formed in a U-shaped cross-section, includes a base 23 and integral legs 24 which provide an annular, inwardly opening channel.

FIG. 2 illustrates a conventional construction, which may be used with the improved coupling. The free ends of the legs 24 form keys or tenons 25, whose inner edges may be recessed or formed with open rabbit-like grooves 26. The key or tenon ends 25 are fitted into exterior, annular grooves 28 formed in a pair of axially aligned pipes 29 and 30 which are to be joined together. The joint is sealed by an annular gasket 32 which may be formed of a suitable resilient, rubber-like material. The gasket includes sealing lips 33 engaged against the adjacent pipe surfaces. Hence, the joint formed by the coupling and the pipes is sealed against leakage by the gasket which also permits some slight amount of flexibility of the joint.

As shown in FIGS. 1 and 3, each of the segment bases 23 is provided with a radially positioned, substantially flat, end face 35 at each of its opposite ends. These end faces are aligned when the segments are assembled together to form the circular coupling casing. Thus, the aligned and engaged radially arranged faces form diametrically aligned junctures 36 at the opposite sides of the coupling.

In addition, the peripheral, external surfaces of each of the segments are flattened near the junctures to provide flat faces 38. These faces are provided with depressed sockets or openings 39 for fastening purposes.

Separate, "standard" size fasteners 40 are arranged at the opposite sides of the coupling for fastening the segments together. As illustrated in FIG. 4, the fasteners comprise a tubular barrel 41 which may have a square or substantially square cross-section and a central opening 42. A tube having a circular cross-sectional upper tubular portion 43 is telescopically inserted in the opening 42 in the barrel 41. The lower end of the tube may be formed as an enlarged, square cross-sectional portion 44, similar in shape to the barrel. The tube is provided with a threaded central opening 45.

A screw is arranged with its head 47 abutting the free end of the barrel and its shank extending through the barrel and into the threaded central opening 45 of the tube. Thus, the tube telescopically slides within the barrel in response to turning the screw.

The barrel and the tube lower portion are each provided with hook-like teeth 50 and 51, respectively. These teeth fit into their respective sockets or openings in the segment flat faces 38. Thus, when the screw is tightened within the tube, the teeth on the barrel move towards the teeth on the tube lower portion and, consequently, compress the segments together. That is, the segments are tightly moved together and held in locked position by the fastener.

Because of the simple arrangement of the fastener parts, the fastener may be applied with a one-hand operation and may be relatively easily applied in "tight" positions or limited spaces such as is sometimes encountered in plumbing contracting jobs. Significantly, the plumber on the job may carry a number of different size pairs of coupling casing segments and a limited number of similar size fasteners which can be used with the different size segments.

FIG. 5 illustrates a modified fastener 53 wherein the barrel 54 is formed circular in cross-section and receives a circular tube 55. Both the barrel and the tube are provided with teeth, similar to that described above, for insertion within the sockets formed in the respective segments. Similarly, a screw 56 is arranged with its head abutted against the upper end of the barrel and its shank passing through the barrel and into a threaded opening formed in the tube in the manner described above.

FIG. 6 illustrates modified coupling segments whose coplanar, flat side faces 57 are provided with multiple pairs of sockets 58. In this case, the fastener utilized would have horizontally or axially spaced apart pairs of teeth for engaging the pairs of sockets. This provides a stronger and more reliable connection between the fasteners and the segments which may be desirable where the couplings are used for very large diameter pipes or for high pressure installations.

This invention may be further developed within the scope of the following claims. Accordingly, it is desired that the foregoing description be read as being merely illustrative of at least one operative embodiment of this invention, and not in a strictly limiting sense.

Thus, having fully described an operative embodiment of this invention, I now claim:

1. A lugless pipe coupling for connecting together adjacent ends of axially aligned pipes, comprising:

a substantially circular casing formed of a pair of substantially semicircular, similar segments, with each segment having radially arranged opposite end faces that abut the corresponding end faces of the other segment to form diametrically aligned junctures;

depressed sockets formed in the exterior, peripheral surface of each of the segments near the junctures said surface near the junctures being substantially planar;

a separate, length-adjustable, elongated fastener extending across each of the junctures, with each fastener including a first and second member, each member having teeth near its opposite ends, with the teeth being releasably inserted within their adjacent sockets in the planar segments at opposite sides of the junctures such that the teeth are in substantially the same plane;

means for manually shortening the length of the fasteners to draw the teeth of said first and second member, on each fastener, together such that the teeth are aligned to be substantially colinear to thereby compress the respective segment juncture faces towards each other;

said pairs of casting segments being interchangeable with different size casing segments for connecting different diameter pipes together, with a single, standard fastener being usable for fastening together a substantial number of different size casing segments whereby one size fastener may be stocked with a multiplicity of different size pairs of segments for use in coupling different diameter pipes.

2. A lugless pipe coupling as defined in claim 1, and with the segments each being formed of a metal casting.

3. A lugless pipe coupling as defined in claim 2, and including the planar exterior peripheral parts of the surfaces of each of the segments in the vicinity of the junctures being formed as a substantially flat face, with the adjacent flat faces of the adjacent segments being approximately coplanar;

and including a number of sockets formed in each of the adjacent coplanar, flat segment faces, and with the sockets in the adjacent flat faces being circumferentially aligned relative to the coupling.

4. A lugless pipe coupling as defined in claim 3, and with a pair of axially spaced apart sockets being formed in each of the segments and the fastener having corresponding pairs of teeth fitted into the respective sockets.

5. A lugless pipe coupling for connecting together adjacent ends of axially aligned pipes, comprising:
- a substantially circular casing formed of a pair of substantially semicircular, similar segments, with each segment having radially arranged opposite end faces that abut the corresponding end faces of the other segment to form diametrically aligned junctures;
- depressed sockets formed in the exterior, peripheral surface of each of the segments near the junctures;
- a separate, length-adjustable, elongated fastener extending across each of the junctures, with each fastener comprising an elongated, internally threaded tube having one end portion telescopically fitted within a tubular barrel and at least one laterally extending tooth formed on its opposite end portion for engaging with a socket in one segment;
- and at least one laterally extending tooth formed on the barrel for engaging a socket formed in the opposite segment;
- a screw having a head engaged against the free end of the barrel and a shank extending axially through the barrel and threadedly engaged within the tube;
- whereby turning the screw forces the barrel to axially move further along the tube for moving the barrel and tube teeth towards each other and, consequently, compressing the adjacent segments towards each other;
- said pairs of casing segments being interchangeable with different size casing segments for connecting different diameter pipes together, with a single, standard fastener being usable for fastening together a substantial number of different size casing segments whereby one size fastener may be stocked with a multiplicity of different size pairs of segments for use in coupling different diameter pipes.

6. A lugless pipe coupling for connecting together the adjacent ends of axially aligned pipes, comprising:
- a substantially circular casing formed of a pair of substantially semicircular, substantially identical segments which are formed of metal castings, and with each segment having radially arranged opposite end faces that abut the corresponding end faces of the other segment to form diametrically aligned junctures;
- depressed sockets formed in the exterior, peripheral surface of each of the segments near the junctures;
- a separate, length-adjustable, elongated fastener extending tranversely across each of the junctures, with each fastener having teeth near its opposite ends, which teeth are releasably inserted within adjacent sockets in both of the segments at opposite sides of the junctures;
- said fasteners including a tubular barrel having at least one laterally extending tooth fitted within a segment socket, and a tubular member which is telescopically, partially inserted in the barrel and extends outwardly therefrom at one end portion and having a laterally extending tooth formed on said end portion and releasably engaged within a socket on the opposite segment, and a screw having a shank extending through the barrel and threadedly engaged within the tube with its head abutted against the free end of the barrel, whereby turning of the screw telescopically slides the tube within the barrel for adjusting the relative positions of the barrel and tube teeth;
- with said pairs of casing segments being interchangeable with different size casing segments for connecting different diameter pipes together, and being usable with a single, standard fastener so that a multiplicity of segments can be used together with a single size, standard fastener.

7. A lugless pipe coupling as defined in claim 6, and with the sockets formed in each of the segments being arranged in adjacent pairs, and the fastener having corresponding pairs of teeth fitted into the adjacent pairs of sockets.

8. A lugless pipe coupling as defined in claim 6, and with each of said teeth being hook-shaped and the teeth on the barrels opening in the opposite direction to the teeth on the tubes for hooking engagement with the adjacent edge portions defining the sockets formed in the segments.

9. A lugless pipe coupling as defined in claim 6, and said barrel being approximately square in cross-sectional, external shape, with the tube having a circular cross-sectional portion inserted within a circular opening formed through the center of the barrel, the tube having an opposite portion which is roughly square in cross-section, and with the barrel having one face engaged against its adjacent segment and the tube having a face engaged against its segment.

10. A lugless coupling as defined in claim 9, and including flat surfaces formed on the exterior of the segments adjacent the junctures, with the barrel and tube flat faces arranged in face-to-face contact with the corresponding flat surfaces on the segments.

* * * * *